US007894661B2

(12) United States Patent
Kosaka et al.

(10) Patent No.: US 7,894,661 B2
(45) Date of Patent: Feb. 22, 2011

(54) CALIBRATION APPARATUS, CALIBRATION METHOD, PROGRAM FOR CALIBRATION, AND CALIBRATION JIG

(75) Inventors: Akio Kosaka, Hachioji (JP); Kazuhiko Arai, Hachioji (JP); Takashi Miyoshi, Atsugi (JP); Kazuhiko Takahashi, Hachioji (JP); Hidekazu Iwaki, Hachioji (JP)

(73) Assignee: Olympus Corporation, Tokyo (JP)

( * ) Notice: Subject to any disclaimer, the term of this patent is extended or adjusted under 35 U.S.C. 154(b) by 1806 days.

(21) Appl. No.: 10/740,348

(22) Filed: Dec. 18, 2003

(65) Prior Publication Data
US 2004/0170315 A1 Sep. 2, 2004

(30) Foreign Application Priority Data
Dec. 27, 2002 (JP) ............................. 2002-382225

(51) Int. Cl.
*G06K 9/00* (2006.01)
(52) U.S. Cl. ........................... 382/154; 348/42; 348/43; 348/44; 348/45; 348/60; 356/12; 356/13; 356/14
(58) Field of Classification Search .................. 382/154
See application file for complete search history.

(56) References Cited

U.S. PATENT DOCUMENTS 5,570,190 A * 10/1996 Terawaki et al. ............ 356/400
5,768,443 A * 6/1998 Michael et al. .............. 382/294

FOREIGN PATENT DOCUMENTS

| JP | 63-311485 | 12/1988 |
|---|---|---|
| JP | 5-12359 | 1/1993 |
| JP | 7-249113 | 9/1995 |
| JP | 8-210816 | 8/1996 |
| JP | 8-328624 | 12/1996 |
| JP | 9-329418 | 12/1997 |
| JP | 11-136706 | 5/1999 |
| JP | 2001-082941 | 3/2001 |
| JP | 2002-354506 | 12/2002 |

OTHER PUBLICATIONS

Personnaz et al., "Camera calibration: estimation, validation and software," Mar. 2002, INRIA, pp. 1-51.*

(Continued)

*Primary Examiner*—Samir A Ahmed
*Assistant Examiner*—John W Lee
(74) *Attorney, Agent, or Firm*—Scully, Scott, Murphy & Presser, P.C.

(57) ABSTRACT

A calibration apparatus which estimates a calibration parameter of an image acquisition apparatus, comprises a calibration jig which includes at least two planes and in which calibration markers having known three-dimensional positions are arranged in each plane based on a predetermined rule. The calibration apparatus further comprises a calibration marker recognition section configured to measure and number in-image positions of the calibration markers in at least one image obtained by photographing the calibration jig by the image acquisition apparatus, and a parameter estimate section configured to estimate the calibration parameters of the image acquisition apparatus by the use of the three-dimensional position and the in-image position of the calibration markers numbered by the calibration marker recognition section.

21 Claims, 9 Drawing Sheets

OTHER PUBLICATIONS

Matthieu Personnaz, "Tele2 version 3.1 User'S Guide," Mar. 2002, INRIA, pp. 1-31.*

Personnaz, et al., "Camera calibration: estimation, validation and software", INRIA Rapport Technique (2002), pp. 1-48.

McIvor, "Calibration of a Laser Stripe Profiler", 3-D Digital Imaging and Modeling, IEEE (1999), pp. 92-98.

Simon, et al., "Reconstructing while registering: a novel approach for markerless augmented reality", Proceedings of the International Symposium on Mixed and Augmented Reality (2002), pp. 285-294.

Mathieu, et al., "Systeme de miroirs pour la stereoscopie", INRIA Rapport Technique (1995), pp. 1-14.

Weng, J., et al., "Camera Calibration with Distortion Models and Accuracy Evaluation", IEEE Transactions on Pattern Analysis and Machine Intelligence, vol. 14, No. 10, Oct. 1992, pp. 965-980.

Girod, B., et al., Edited, Principles of 3D image analysis and synthesis, Kluwer Academic Publishers, 2000, pp. 29-30.

Motai, Y., et al., "Smart View: Hand-Eye Robotic Calibration for Active Viewpoint Generation and Object Grasping", Proceedings of the IEEE International Conference on Robotics and Automation, Seoul, Korea, pp. 2183-2190, May 2001.

Kosaka, A., et al., "Fast Vision-Guided Mobile Robot Navigation Using Model-Based Reasoning and Prediction of Uncertainties", CVGIP: Image Understanding, vol. 56, No. 3, Nov. 1992, pp, 271-329.

Trucco, E., et al., "Introductory Techniques for 3-D Computer Vision", Prentice Hall, 1998, pp. 157-161.

Oliver Faugeras, Three-Dimensional Computer Vision, MIT Press, 1993, pp. 230-235.

Motai, Yuichi et al., Hand-Eye Calibration Applied to Viewpoint Selection for Robotic Vision, IEEE Transactions on Industrial Electronics, Oct. 2008, vol. 55, No. 10.

* cited by examiner

US 7,894,661 B2

CALIBRATION APPARATUS, CALIBRATION METHOD, PROGRAM FOR CALIBRATION, AND CALIBRATION JIG

CROSS-REFERENCE TO RELATED APPLICATIONS

This application is based upon and claims the benefit of priority from the prior Japanese Patent Application No. 2002-382225, filed Dec. 27, 2002, the entire contents of which are incorporated herein by reference.

BACKGROUND OF THE INVENTION

1. Field of the Invention

The present invention relates to a calibration apparatus and a calibration method in which an image acquisition apparatus is calibrated, a program for calibration for allowing a computer to function as the calibration apparatus, and a calibration jig to be combined with the calibration apparatus.

2. Description of the Related Art

A calibration method of an image acquisition apparatus, or camera calibration is an important technique in image processing. This technique is used especially in three-dimensional measurement or object recognition using a camera and object grasping by a robot. By a camera calibration technique, optical and geometrical characteristics of the image acquisition apparatus, such as cameras, are specified as described later, and the technique is important also as a problem that projective transformation parameters of the camera, a position and orientation parameter of the camera in an environment, and the like are estimated. To calculate or estimate these camera calibration parameters, a marker (marker or landmark for the calibration) having a known three-dimensional position in a world coordinate frame in which the camera is disposed is photographed by the camera. A two-dimensional position of the image of the marker photographed in the camera image is calculated in the image. Various camera parameters are calculated from a positional relation between the three-dimensional position of the marker and the two-dimensional position of the image of the marker. Various methods of the camera calibration have been known.

One of the methods of the camera calibration is described in J. Weng, P. Cohen, and M. Herniou, "Camera Calibration with Distortion Models and Accuracy Evaluation," IEEE Transactions of Pattern Analysis and Machine Intelligence, Vol. 14, No. 10, 1992, pp. 965 to 980. In the method described in this document, a plane board on which a plurality of square calibration markers having the same size are arranged, and a z-stage on which the plane board is slid in a z-axis direction are prepared as calibration jigs. Vertices of these squares are recognized by image processing to measure the position or each marker in the image. A z value obtained from a z stage is combined with an xy coordinate on the plane board to measure the three-dimensional position in the world coordinate frame of each marker. Moreover, for of the corresponding marker, the three-dimensional position in the world coordinate frame and the two-dimensional position in a plurality of images are used to estimate the calibration parameters of the image acquisition apparatus.

In B. Girod, et al., edited, Principles of 3D image analysis and synthesis, Kluwer Academic Publishers, 2000, pp. 29 to 30, a method is disclosed in which the calibration markers are mutually arranged on three vertical planes, and the marker is recognized to calibrate the image acquisition apparatus (camera).

In Oliver Faugeras, Three-Dimensional Computer Vision, MIT Press, 1933, pp. 230 to 235, a calibration jig constituted of two planes (calibration boards) is proposed. A plurality of square markers are arranged on each calibration board, and four vertices of each square are extracted in the image processing to estimate the position of the marker in the image. Color of these squares constituting the markers is different from that of background, and therefore a boundary via which two planes can be separated is clear.

BRIEF SUMMARY OF THE INVENTION

According to a first aspect of the present invention, there is provided a calibration apparatus which estimates a calibration parameter of an image acquisition apparatus. The calibration apparatus comprises: a calibration jig which includes at least two planes and in which calibration markers having known three-dimensional positions are arranged in each plane based on a predetermined rule; a calibration marker recognition section configured to measure and number in-image positions of the calibration markers in at least one image obtained by photographing the calibration jig by the image acquisition apparatus; and a parameter estimate section configured to estimate the calibration parameters of the image acquisition apparatus by the use of the three-dimensional position and the in-image position of the calibration markers numbered by the calibration marker recognition section.

According to a second aspect of the present invention, there is provided a calibration apparatus which estimates calibration parameters of a plurality of image acquisition apparatus. The calibration apparatus comprises: a calibration jig which includes at least two planes and in which calibration markers having known three-dimensional positions are arranged in each plane based on a predetermined rule; a calibration marker recognition section configured to measure and number in-image positions of the calibration markers in at least one image obtained by photographing the calibration jig by the plurality of image acquisition apparatus from different positions; and a parameter estimate section configured to estimate the calibration parameters of the plurality of image acquisition apparatus by the use of the three-dimensional position and the in-image position of the calibration markers numbered by the calibration marker recognition section.

According to a third aspect of the present invention, there is provided a calibration apparatus which estimates calibration parameters of an image acquisition apparatus including a stereo adapter. The calibration apparatus comprises: a calibration jig which includes at least two planes and in which calibration markers having known three-dimensional positions are arranged in each plane based on a predetermined rule; a calibration marker recognition section configured to measure and number in-image positions of the calibration markers in at least one image obtained by photographing the calibration jig from different positions via the stereo adapter by the image acquisition apparatus including the stereo adapter; and a parameter estimate section configured to estimate the calibration parameters of the image acquisition apparatus including the stereo adapter by the use of the three-dimensional position and the in-image position of the calibration markers numbered by the calibration marker recognition section.

According to a fourth aspect of the present invention, there is provided a calibration apparatus which estimates a calibration parameter of an image acquisition apparatus. The calibration apparatus comprises: an image input section configured to input an image obtained by photographing a calibration jig including at least two planes and including calibration markers having known three-dimensional positions and arranged in each plane based on a predetermined rule by the image acquisition apparatus; a calibration marker recognition section configured to measure and number in-image positions of the calibration markers in at least one image photographed by the image acquisition apparatus and inputted by the image input section; and a parameter estimate section configured to estimate the calibration parameters of the image acquisition apparatus by the use of the three-dimensional position and the in-image position of the calibration markers numbered by the calibration marker recognition section.

According to a fifth aspect of the present invention, there is provided a calibration method in which a calibration parameter of an image acquisition apparatus is estimated. The calibration method comprises: inputting an image obtained by photographing a calibration jig including at least two planes and including calibration markers having known three-dimensional positions and arranged in each plane based on a predetermined rule by the image acquisition apparatus; measuring and numbering in-image positions of the calibration markers in at least one inputted image photographed by the image acquisition apparatus; and estimating the calibration parameter of the image acquisition apparatus by the use of the three-dimensional position and the in-image position of the numbered calibration markers.

According to a sixth aspect of the present invention, there is provided a program for calibration which allows a computer to realize the following function in order to estimate a calibration parameter of an image acquisition apparatus. The function comprises: inputting an image obtained by photographing a calibration jig including at least two planes and including calibration markers having known three-dimensional positions and arranged in each plane Based on a predetermined rule by the image acquisition apparatus; measuring and numbering in-image positions of the calibration markers in at least one inputted image photographed by the image acquisition apparatus; and estimating the calibration parameter of the image acquisition apparatus by the use of the three-dimensional position and the in-image position of the numbered calibration markers.

According to a seventh aspect of the present invention, there is provided a calibration jig combined with a calibration apparatus which estimates a calibration parameter of an image acquisition apparatus based on an image obtained by photographing the calibration jig including a predetermined calibration marker by the image acquisition apparatus. The calibration jig comprises: at least a plurality of planes; and a plurality of types of calibration markers which are arranged in each of the plurality of planes based on a predetermined rule and whose three-dimensional positions are known.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will hereinafter be described with reference to the drawings.

First Embodiment

Figure 1:
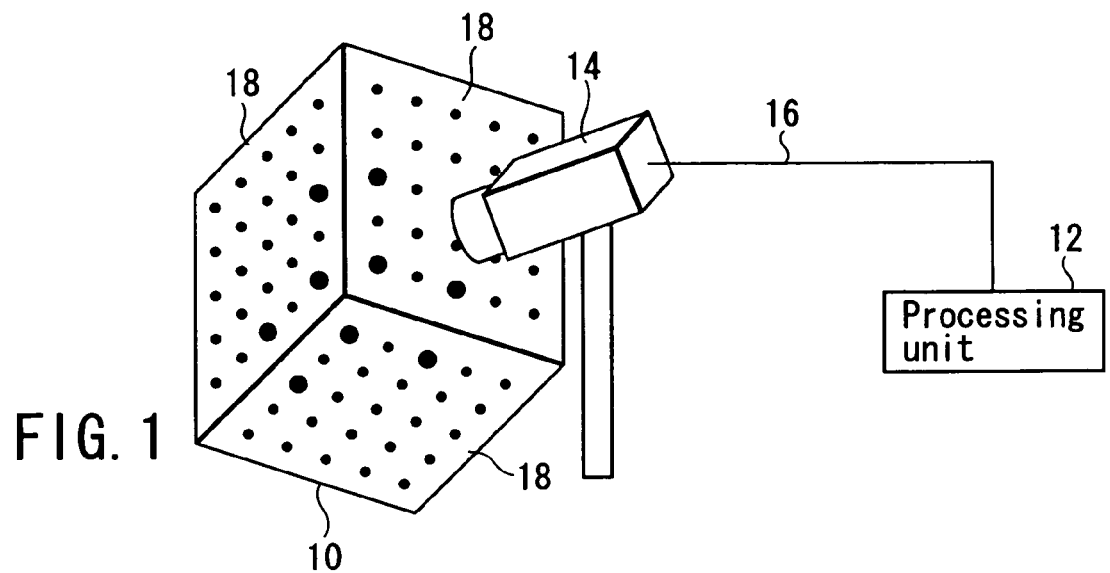
FIG. 1 is a diagram showing a basic constitution of a calibration apparatus according to a first embodiment of the present invention.

As shown in FIG. 1, a calibration apparatus according to a first embodiment of the present invention includes a calibration jig 10 and an arithmetic unit 12. The calibration jig 10 is photographed by an image acquisition apparatus 14 to be calibrated, and a calibration pattern is added to the jig. An image (or a video signal) 16 photographed by the image acquisition apparatus 14 is inputted into the processing unit 12, and the processing unit processes the inputted image (or the video signal) 16, and calculates a calibration parameter concerning the image acquisition apparatus 14. That is, the processing unit 12 functions as an image input section, a calibration marker recognition section, and a parameter estimation section.

It is to be noted that the image acquisition apparatus 14 may be any apparatus for photographing or inputting the image, such as a video camera and a digital camera. The arithmetic unit 12 may be a general-purpose computer such as a personal computer, or an exclusive-use operation processing apparatus. Furthermore, the image (or the video signal) 16 may be exchanged between the image acquisition apparatus 14 and the processing unit 12 via communication. The image may also be transferred via electronic media (e.g., a memory, compact flash (registered trademark) memory, floppy (registered trademark) disk, smart media (trademark), CD-ROM, magnetoptical disk). The processing unit 12 may exist in the image acquisition apparatus 14. In this case, the operation may also be performed by a hardware circuit or software processing in the image acquisition apparatus 14.

Figure 2:
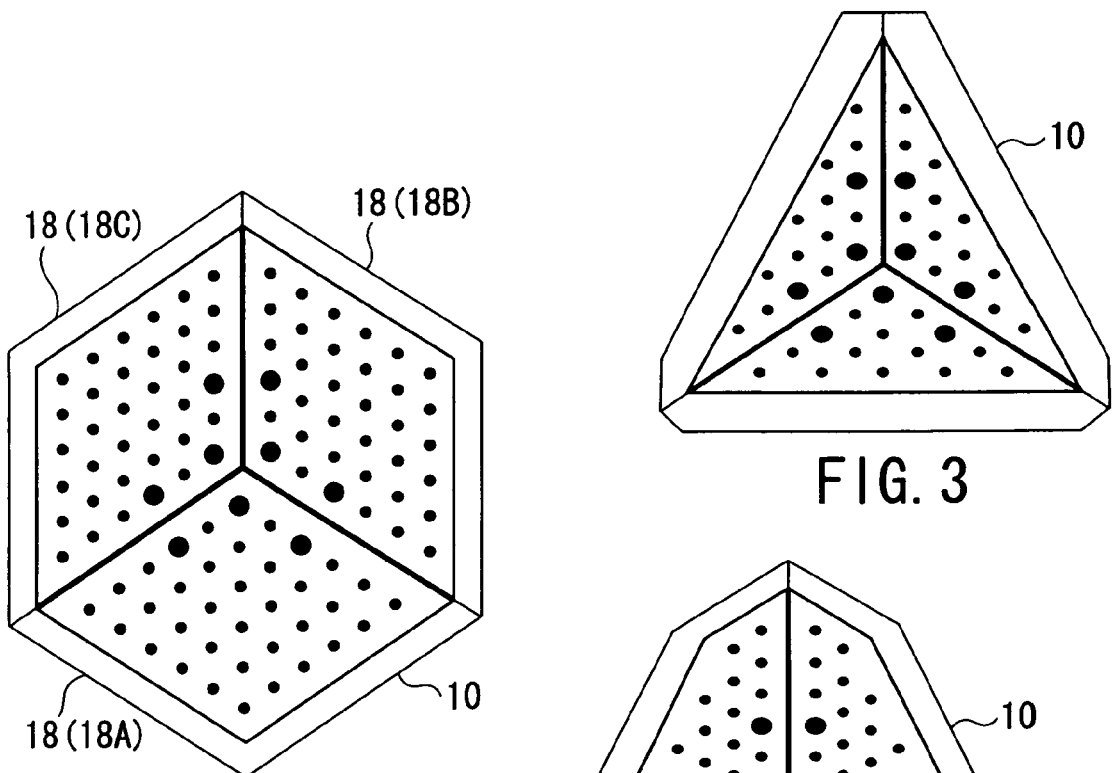
FIG. 2 is a diagram showing an example of a calibration jig.
Figure 3:
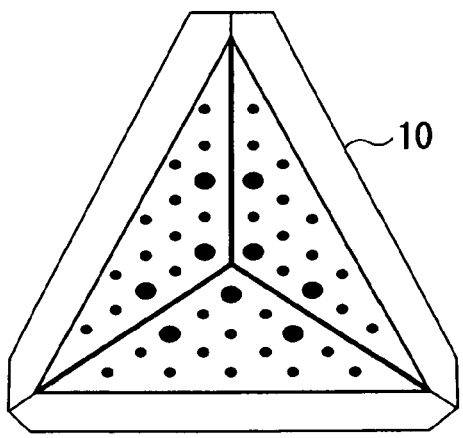
FIG. 3 is a diagram showing another example of the calibration jig.
Figure 4:
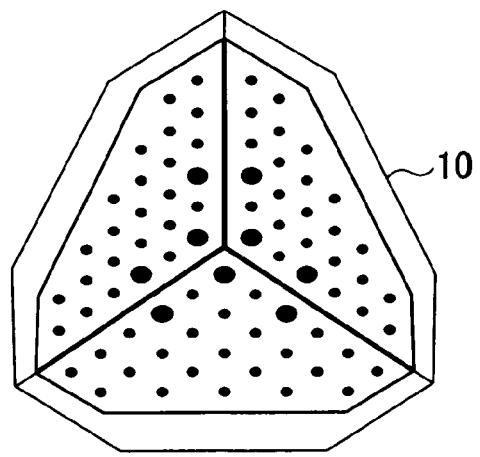
FIG. 4 is a diagram showing still another example of the calibration jig.

The calibration jig 10 is constituted in the form of a corner cube in which three planes 18 cross at right angles to one another. Each of the planes 18 may have, for example, a square shape as shown in FIG. 2, a triangular shape as shown in FIG. 3, or a pentangular shape as shown in FIG. 4. Furthermore, although not shown, a circular arc shape may also be constituted. These three planes crossing at right angles to one another are considered to constitute an xy plane, yz plane, and zx plane in a coordinate frame specified by the calibration jig 10. For example, in FIG. 2, a plane 18A positioned in a lower part is defined as an xy plane, a plane 18B positioned right above is defined as a yz plane, and a plane 18C positioned left above is defined as a zx plane. Moreover, at this time, a straight line via which the xy plane intersects with the yz plane is defined as a y-axis, a straight line via which the yz plane intersects with the zx plane is defined as a z-axis, a straight line via which the zx plane intersects with the xy plane is defined as an x-axis, and a point at which three planes intersect with one another is defined as an origin O. By this definition, positional relation among the planes and ordinate system can be determined. That is, the xy plane is defined as a z=0 plane, the yz plane is defined as an x=0 plane, and the zx plane is defined as y=0.

Figure 5:
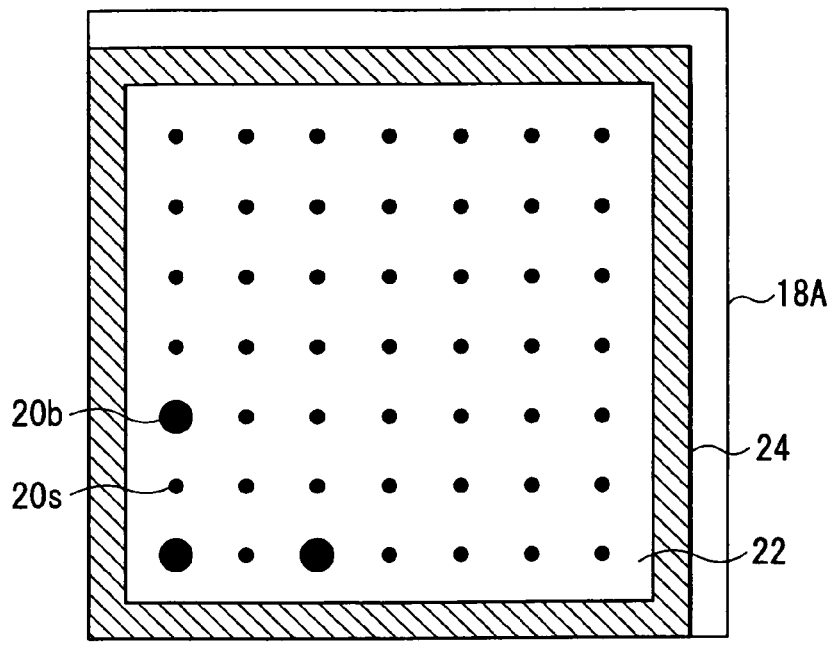
FIG. 5 is a diagram showing one plane constituting the calibration jig.

As shown in FIG. 5, circular markers 20b, 20s having two types of sizes exist in one plane 18 constituting the calibration jig 10. Concretely, with the calibration jig 10 constituted of three planes as shown in FIG. 2, three large markers 20b having different sizes exist in the vicinity of the origin at which three planes intersect with one another as described above. In each plane 18 of the present calibration jig 10, white is a background, and markers (large markers 20b and small markers 20s) are printed in black. The white background including all the markers in each plane will hereinafter be referred to as a background region 22 of markers. Moreover, a background boundary (or a background boundary curve) 24 exists in black so as to surround the background region 22 of markers. The background boundary (or the background boundary curve) 24 is important in that a region where the markers exist is limited, and the use of the background boundary 24 will be described later in detail.

Figure 6:
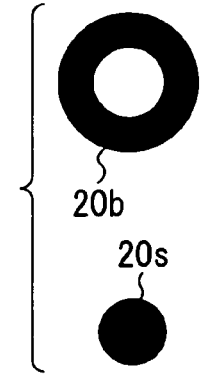
FIG. 6 is a diagram showing another example of a calibration marker.

Here, it is evident that the marker is shown in black, the background is shown in white, and, needless to say, opposite colors may also be used. Two types of markers are distinguished by a size such as the large markers 20b and small markers 20s, but when a color camera can be used, it is evident that two types of markers can be distinguished by color. As shown in FIG. 6, the large marker 20b may also be constituted of a white/black double circle. As another constitution, the background region 22 of markers including the markers is gray, the large markers 20b are white, and the small markers 20s are black. Instead of using two gradations of density values, a marker constitution may use two or more gradations of density values.

Figure 7:
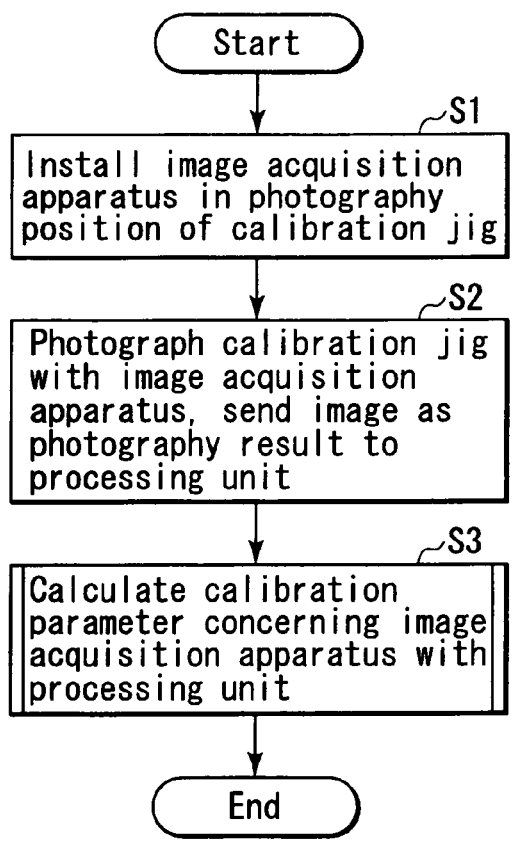
FIG. 7 is a diagram showing an operation flowchart of the whole calibration apparatus according to the first embodiment.

Next, an operation of the calibration apparatus constituted in this manner will be described with reference to a flowchart of FIG. 7. That is, the image acquisition apparatus 14 to be calibrated is set in a position where the calibration jig 10 can be photographed as described above (step S1). Moreover, the calibration jig 10 is photographed with the image acquisition apparatus 14 (step S2). Here, when the calibration jig 10 is actually photographed with the image acquisition apparatus 14, the jig is photographed in such a manner that the large markers 20b existing in each plane 18 exist within the photographed image, or the large markers 20b are arranged in the middle of the image if possible. This is a photography guiding principle for a photographer. The positions of the large markers 20b in the image, which is the photography guiding principle, plays an important role in enhancing precision of marker recognition as described later. This is important, especially when an influence of distortion of the optical lens is large.

The image (or the video signal) 16 of the calibration jig 10 photographed in this manner is sent to the processing unit 12. Therefore, the processing unit 12 uses geometric information of the calibration jig 10, and the image (or the video signal) 16 photographed in the step S2 to calculate the calibration parameter concerning the image acquisition apparatus 14 (step S3).

Figure 8:
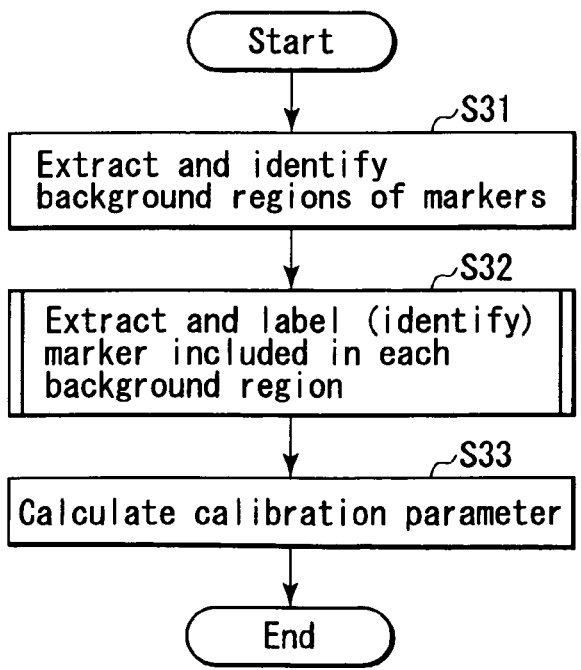
FIG. 8 is a flowchart of a sub-routine for calculating calibration parameters.

A sub-routine for calibration parameter calculation performed in the processing unit 12 of the step S3 is shown in FIG. 8. First, a step of recognizing the background region of markers is carried out (step S31). That is, three background regions 22 of markers are extracted from the image (or the video signal) 16 obtained from the image acquisition apparatus 14. Moreover, the xy, yz, or zx plane corresponding to the extracted region is identified, namely recognized.

Subsequently, a step of marker recognition is carried out (step S32). That is, the regions corresponding to the large and small markers 20b, 20s arranged in each plane are extracted from the region surrounded with the background region 22 of markers with respect to the respective planes (xy, yz, zx planes) identified in the step S31. Moreover, these regions are identified, or labeled as those planes.

Figure 9:
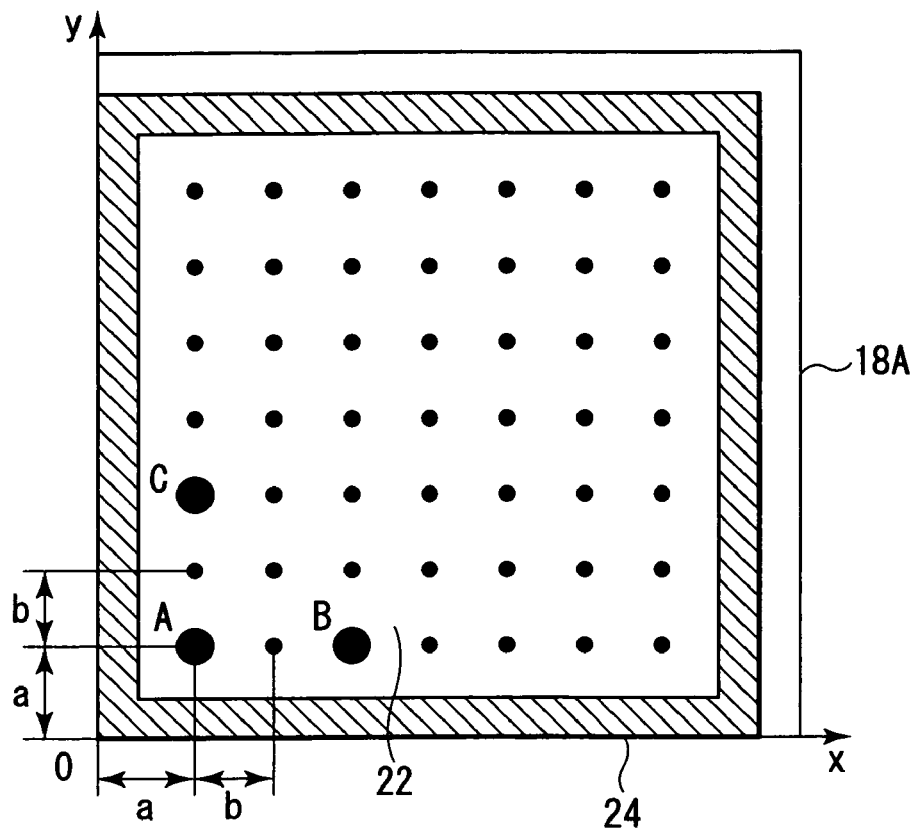
FIG. 9 is an explanatory view of a positional relation among three large markers.

It is assumed here that three markers constituting the large markers 20b are denoted with A, B, C as shown in FIG. 9, and the plane 18 corresponds to the xy plane (plane 18A) of the calibration jig 10. In this case, it can be assumed that A-B specifies an x-axis in the world coordinate frame which is a three-dimensional space, and A-C specifies a y-axis in the world coordinate frame which is the three-dimensional space. Therefore, when a positional relation among A, B, C in the image is considered as described later in detail, it is possible to calculate a rough direction vector in the image with respect to the x and y axes of the world coordinate frame. Needless to say, the direction vector is a nearly correct estimated value in the vicinity of a position where A, B, C exist. However, excessively apart from A, B, C, the estimated value of the direction vector includes an error by the influence of the distortion of the lens of an optical system (not shown) disposed as an image input section or image acquisition means in the image acquisition apparatus 14. To solve the problem, the calibration marker is identified (or numbered) in a method described later.

Figure 10:
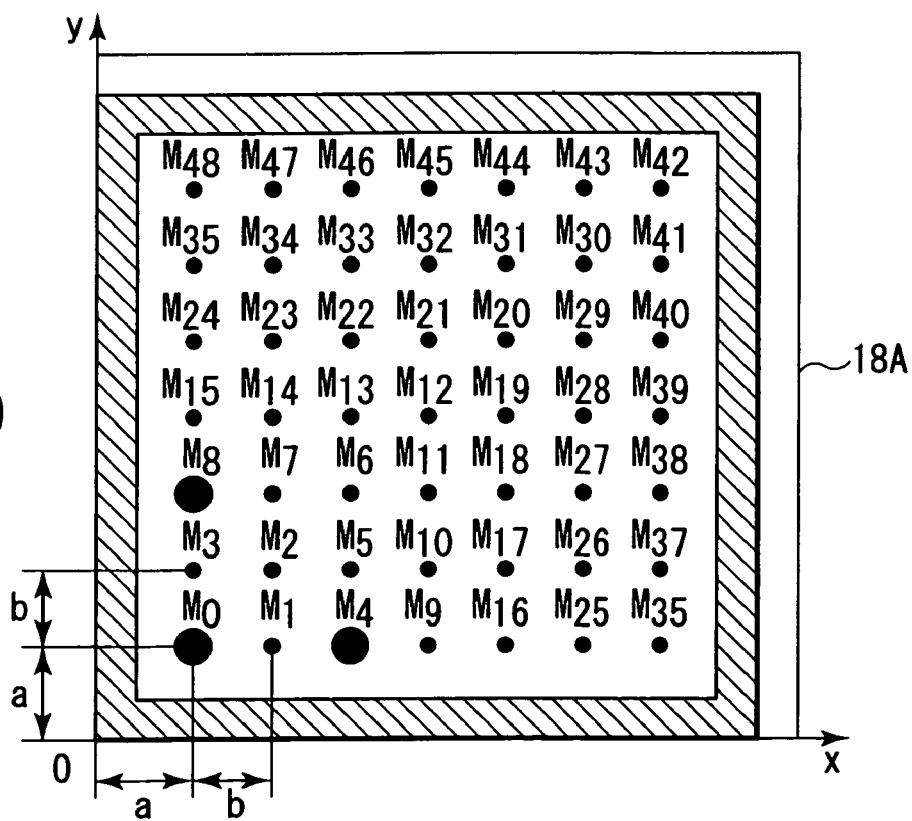
FIG. 10 is a diagram showing a coordinate function with a label of the marker in each plane.

Furthermore, FIG. 10 is a diagram showing the labels and coordinate relation of the markers in each plane. A group of the markers are numbered like $M_1, M_2, \ldots, M_n$ spirally from $A=M_0$ which is a base point in a counterclockwise direction. That is, the large marker B is numbered as $M_4$, and the large marker C is numbered as $M_8$. Moreover, for example, as shown in FIG. 10, a three-dimensional position coordinate of each marker can be granted on the basis of the origin O with respect to the marker group on the xy plane. For example, assuming that offsets to $M_0$ from the origin O in x and y directions are both a (meter), and an interval between the markers in the x and y directions is b (meter), a three-dimensional coordinate value (x, y, z) of each representative marker can easily be calculated as follows.

| Marker $M_0$ | (a, a, 0) |
| Marker $M_1$ | (a + b, a, 0) |
| Marker $M_2$ | (a + b, a + b, 0) |
| Marker $M_3$ | (a, a + b, 0) |
| Marker $M_4$ | (a + 2b, a, 0) |

Figure 11:
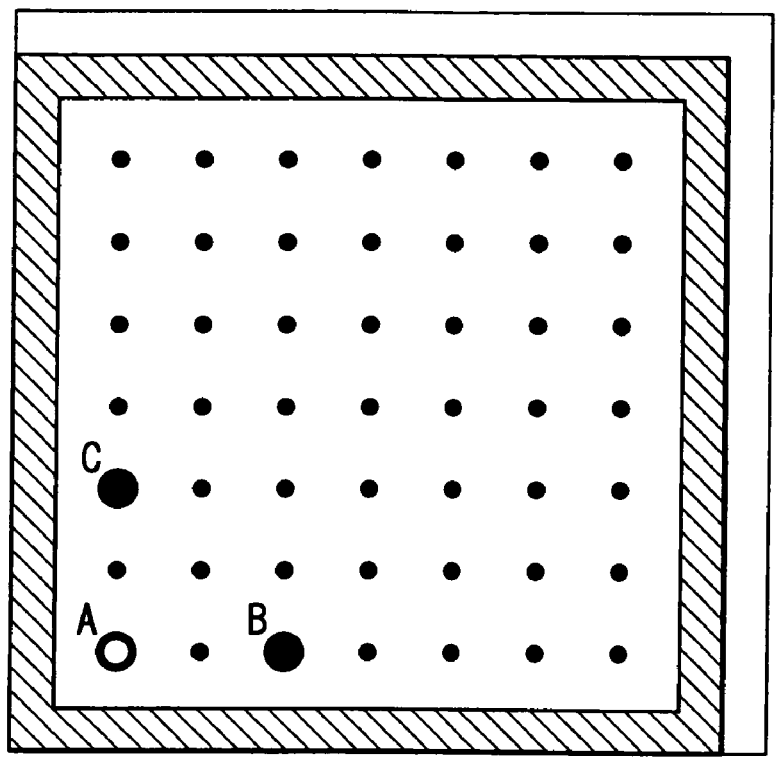
FIG. 11 is a diagram showing another example of one plane constituting the calibration jig.

It is to be noted that, as shown in FIG. 11, only the large marker 20b nearest to the origin O may also be constituted of the white/black double circle as shown in FIG. 6, so that the marker A indicating M=0 can easily be detected.

By the above-described process of the marker recognition, with respect to each marker $M_i$ (i=0, 1, 2, . . . ), the position of a marker three-dimensional position $(x_i, y_i, z_i)$ in the world coordinate frame on the basis of the calibration jig 10, and a two-dimensional position $(u_i, v_i)$ in the corresponding image can be calculated or measured.

Thereafter, the process of parameter calculation is carried out (step S33). That is, the three-dimensional position $(x_i, y_i, z_i)$ and two-dimensional position $(u_i, v_i)$ of the marker associated with each other in the step S32 are used to calculate the camera calibration parameters concerning the image acquisition apparatus 14.

These steps S31, S32, S33 will hereinafter be described in detail.

(Recognition Method of Background Region of Markers)

Figure 12:
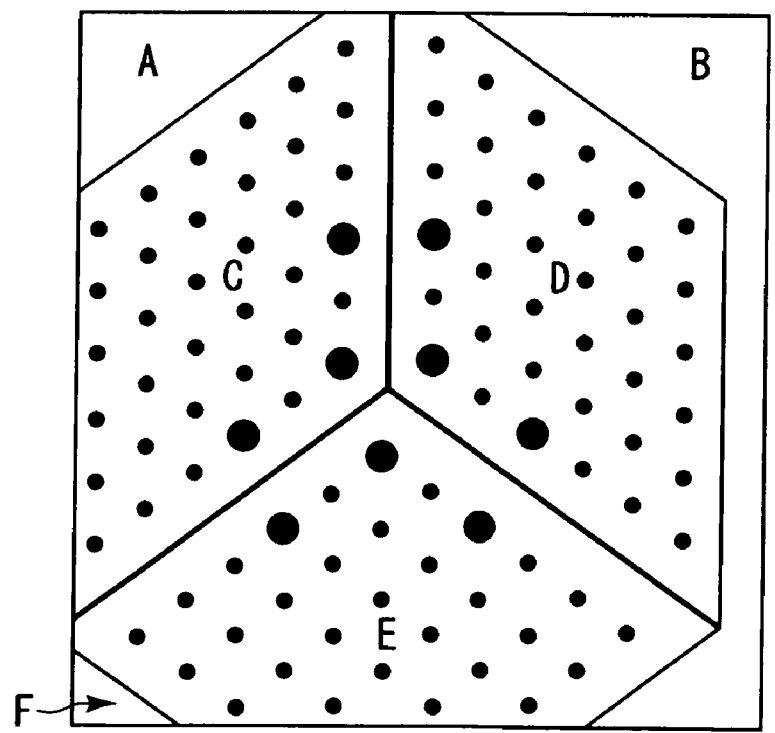
FIG. 12 is a diagram showing a typical example of a photographed image.

First, a recognition method of background region of markers of the step S31 will be described. With respect to the image (or the video signal) 16 of the calibration jig 10 photographed with the image acquisition apparatus 14, the markers 20b, 20s are photographed substantially in black, and the background region 22 of markers is photographed substantially in white. Then, an appropriate threshold value is set, and the image 16 is binarized. Then, the background region 22 of markers is converted to "1", elliptic or circular regions indicating the markers 20b, 20s are converted to "0", and the region of the background boundary 24 is converted to "0". Here, when a binary region indicating "1" is extracted, three background regions 22 of markers and objects other than the calibration jig reflected in white are extracted as the binary region (object region) designated by the label "1". It is to be noted that three background region 22 of markers are separated via the black background boundary 24, and these background regions 22 of markers can certainly be distinguished from one another as closed regions in the image. Typical image photography is shown in FIG. 12. In this case, image regions C, D, E which are the background regions 22 of markers and the other regions A, B, F are registered as regions indicating label "1".

In the process of photographing the calibration jig, it does not matter if a part of the jig is not be photographed. Nor does it matter if the background is photographed, as shown in FIG. 12.

Next, the background region 22 of markers or only a part of the region is extracted. The following conditions of the extraction may be used:
1) at least a part of the background region 22 of markers is positioned in the vicinity of a center of the image;
2) the area is larger than some threshold value; and
3) the background regions 22 of markers of the three planes are adjacent to one another in the vicinity of a middle of the area. By these extraction conditions, for example, as shown in FIG. 12, the image regions C, D, E are extracted/selected. After extracting a plurality of background regions 22 of markers in this manner, the xy, yz, or zx plane corresponding to each of the regions is determined. For this, the following method is used.

First, it is assumed that the image regions extracted as the background regions 22 of markers are α, β, γ. Next, assuming that centroid positions in these image regions are $P_\alpha, P_\beta, P_\gamma$, a mean position is calculated by the following:

$$\overline{P} = \frac{1}{3}(P_\alpha + P_\beta + P_\gamma)$$

Moreover, in consideration of vectors $\overline{PP_\alpha}, \overline{PP_\beta}, \overline{PP_\gamma}$, these vectors are rearranged so as to turn counter-clockwise. Furthermore, among the images 16, an image whose centroid is positioned in a lowermost portion is assumed as the background region 22 of markers constituting the xy plane, and images constituting the yz and zx planes are selected in such an order that the vectors turn counterclockwise. Accordingly, three background regions 22 of markers can be assumed as the xy, yz, zx planes. In this case, for example, as shown in FIG. 12, it can be recognized that the image region E corresponds to the xy plane, the image region D corresponds to the yz plane, and the image region C corresponds to the zx plane in the background region 22 of markers.

(Marker Recognition Method)

Next, a method of recognizing the marker in the step S32 will be described. That is, an outline of the method of recognizing the large and small markers for use in the calibration will be described. As described above, when the recognition of the background region 22 of markers ends, it becomes important to correctly recognized the large and small markers 20b, 20s surrounded with the background region. The large and small markers 20b, 20s are defined as the circular markers, but are not necessarily photographed as right circles in the image 16 photographed by the image acquisition apparatus 14. However, the shape can be approximated by an ellipse.

Figure 13:
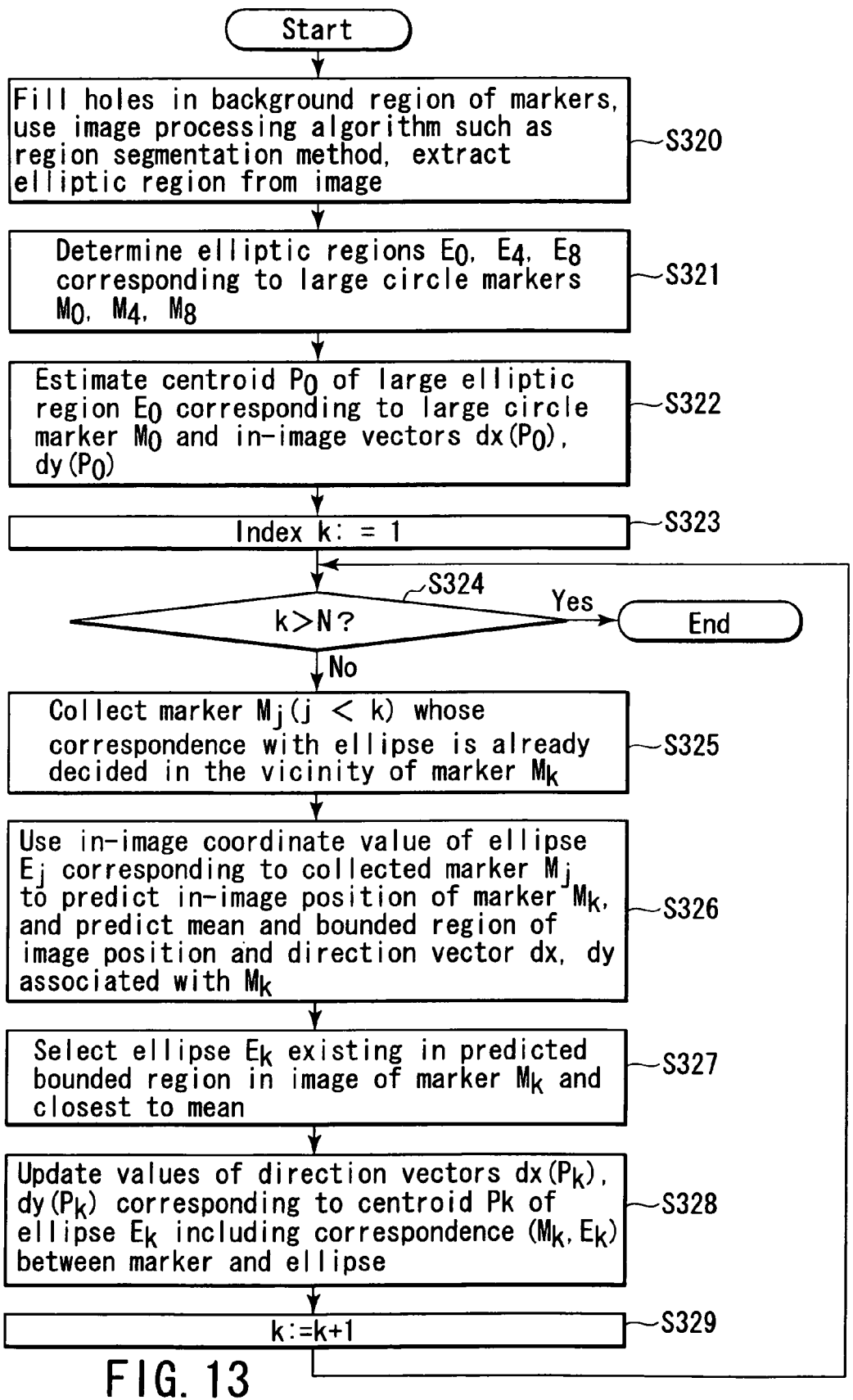
FIG. 13 is a flowchart of a marker recognition process.

FIG. 13 shows a flowchart of this marker recognition process. That is, first, only the elliptic region is extracted from the image 16 (step S320). This is performed as follows. For each background region 22 of markers, a hole filling binarizing process in the background region 22 of markers is performed, and an inclusive region including the background region 22 of markers and marker region is prepared. The inclusive region is divided into a marker region and background region in the plane by the binarizing process in which an appropriate threshold value is used. Alternatively, region segmentation algorithms such as Rahardja/Kosaka are applied. Large and small elliptic regions are extracted in this manner. Here, these elliptic regions are represented by $E_j$ (j=0, 1, 2, . . . ).

Next, the large elliptic regions $E_0$, $E_4$, $E_8$ corresponding to $M_0$, $M_4$, $M_8$ which are large markers 20$b$ are selected in accordance with their geometric constraints such as their areas (step S321). In this case, it is confirmed whether correspondence can correctly be established in consideration of geometric constraints among the markers. Thereafter, when the centroid of the large elliptic region $E_0$ is assigned as $P_0$, direction vectors $dx(P_0)$ and $dy(P_0)$ in $P_0$ are calculated from a positional relation between the large elliptic regions $E_4$, $E_8$ (step S322). Initialization of the algorithm ends here.

Thereafter, the ellipse $E_k$ corresponding to the marker $M_k$ (k=1, 2, . . . , N) is searched in order of the markers $M_1$, $M_2$, $M_3$, . . . as in a spiral order. Therefore, first, after initially setting the value of an index k to "1" (step S323), the following steps S324 to S329 are repeated. That is, it is first judged whether or not the index k exceeds N in order to judge whether all the markers to the marker $M_N$ are recognized (step S324). Here, in the presence of the marker in which the index does not exceed N, that is, which is not recognized yet, the marker $M_j$ (j<k) whose correspondence with the ellipse is established is collected (step S325). It is to be noted that the vicinity of 5×5 indicates that a difference of the coordinate value in the x-axis direction with respect to the coordinate position (x, y) of the noted marker $M_k$ is within two intervals or that the difference of the coordinate value in the y-axis direction is within two intervals. Therefore, the total number of markers which exist in the vicinity of 5×5 is 24 excluding the noted marker $M_k$. The vicinity of 5×5 may be replaced by any other, such as vicinity of 3×3 or vicinity of 7×7.

Next, the coordinate values of the collected marker group $\{M_j|j<k\}$ and ellipse group $\{E_j|j<k\}$ whose correspondence with the markers is established are used to predict the position of the marker $M_k$ in the image. For the prediction, the mean and the bounded region of the predicted image positions associated with the marker $M_k$ are computed. Furthermore, direction vectors dx, dy in the centroid of the ellipse corresponding to the marker $M_k$ are also predicted (step S326). Moreover, the ellipse $E_k$ which exists in the bounded region of the marker $M_k$ and which is nearest to the mean is selected (step S327). Thereafter, the values of $dx(P_k)$, $dy(P_k)$ corresponding to the centroid $P_k$ of the ellipse $E_k$ including the correspondence ($M_k$, $E_k$) of the marker are updated (step S328). Moreover, after increasing the value of the index k by "1" (step S329), the process returns to the step S324.

The steps S324 to S329 are repeated in this manner. When the value of the index k exceeds N (step S324), the marker recognition process is ended.

The marker recognition algorithm, especially the correspondence (labeling) between the marker and the ellipse will hereinafter be described in detail. That is, the labeling between the marker $M_k$ and the ellipse $E_j$ extracted from the image will hereinafter be described. Basically, the ellipses corresponding to the large markers ($M_0$, $M_4$, $M_8$) which are major characteristics among the markers are first extracted. Moreover, an initial estimated value and origin $P_0$ of the direction vectors dx, dy in the image of the x and y-axes directions specifying the geometric position of the marker are determined by the ellipse group already labelled. Thereafter, the ellipses $E_1$, $E_2$, $E_3$, . . . corresponding to the markers $M_1$, $M_2$, $M_3$, . . . are successively determined or numbered in a recursive manner. This method will be described.

It is to be noted that here terms are defined as follows.

1) Marker $M_k$: Large Marker (Large Circular Marker) 5$b$ and Small Marker (Small Circular Marker) 5$s$ The markers are constituted of the large markers 20$b$ of $M_0$, $M_4$, $M_8$, and the other small markers 20$s$.

2) Ellipse (Large) and Ellipse (Small) $E_j$

A projected image onto the image associated with marker $M_k$ can generally be approximated by the ellipse. The ellipse extracted from the image is represented by the geometric features such as the centroid (centroid coordinates) and the areas.

3) x-axis and y-axis, direction step (sx, sy), and direction vector (dx, dy)

The relative position between the markers is represented by sx, sy. Here, sx, sy denote the step numbers in the x-axis and y-axis directions, and dx, dy denote distances between landmarks disposed adjacent to each other in the image in the x and y directions. More concretely, a distance in which the corresponding ellipse advances by one step in the x-axis direction is dx, and a distance in which the ellipse advances by one step in the y-axis direction is dy. Since dx, dy are not uniform in the image, they are defined with respect to the centroid of each extracted ellipse.

By this definition, the numbering algorithm steps will hereinafter be described.

1) Recognition of Three Large Ellipses (Process of the Step S321)

First, a set of ellipses region-extracted by the process of the step S320 is sorted by the area in the decreasing order.

Next, three ellipses having a large area are selected, and it is judged whether or not these ellipses satisfy the following conditions.

i) The area is approximately equal (e.g., a region in which maximum and minimum ratios are present among the areas of three ellipses).

When this condition is satisfied, three ellipses are assumed to be recognized. Moreover, these three ellipses are numbered as $M_0$, $M_4$, $M_8$.

2) Initial Value Estimate of Direction Vectors dx, dy

An initial value of the direction vector dx which specifies the x direction between adjacent lattice points is calculated from the coordinates of $M_0$, $M_4$, ($u_0$, $v_0$) and ($u_4$, $v_4$)

$$dx = \frac{1}{2}\left(\begin{bmatrix} u_4 \\ v_4 \end{bmatrix} - \begin{bmatrix} u_0 \\ v_0 \end{bmatrix}\right)$$

Moreover, the initial value of the direction vector dy which specifies the y direction between the adjacent lattice points is calculated from the coordinates of $M_0$, $M_4$, ($u_0$, $v_0$) and ($u_8$, $v_8$)

$$dy = \frac{1}{2}\left(\begin{bmatrix} u_8 \\ v_8 \end{bmatrix} - \begin{bmatrix} u_0 \\ v_0 \end{bmatrix}\right)$$

3) Recognition of Center Point $P_0$ (Process of the Step S322)

A large ellipse nearest to the centroid of three large ellipses is labeled as $E_0$, and the centroid of $E_0$, ($u_0$, $v_0$), is set to the point $P_0$. The above-described initial values of dx, dy are used as the direction vectors $dx(P_0)$, $dy(P_0)$ of this point $P_0$.

4) Recursive Ellipse Labeling Method

It is now assumed that an ellipse $E_{k-1}$ corresponding to a marker $M_{k-1}$ and center point $P_{k-1}$ (k=1, 2, . . . ) are obtained.

It is also assumed that direction vectors $dx(P_{k-1})$, $dy(P_{k-1})$ in the center point of each ellipse can be calculated. In this case, there is also a possibility that the ellipse $E_i$ (0<i<k) corresponding to the some marker $M_i$ cannot be detected. At this time, it is considered that the ellipse $E_k$ corresponding to the marker $M_k$ is labeled.

a) The landmark in the vicinity of 5×5 of the marker $M_k$ is collected (process of the step S325).

b) The center point $P_j$ of the ellipse $E_j$ already labeled in accordance with the vicinity marker $M_j$ and the direction vectors $dx(P_j)$, $dy(P_j)$ are used to calculate a predicted position $P_k^0$ of the center value $P_k$ corresponding to the marker $M_k$ (process of the step S326). In this case, assuming that steps between $M_i$ and $M_k$ in the x and y directions are sx, sy (sx=−2, −1, 0, 1, 2; sy=−2, −1, 0, 1, 2) associated with marker $M_i$, in the vicinity of Marker $M_k$, the following results, where $N_b(M_k)$ for $M_k$ indicates the set of neighborhood markers for $M_k$:

$$P_k^0 = \frac{1}{|N_b(M_k)|} \sum_{i \in N_b(M_k)} \begin{bmatrix} (sx(M_i \to M_k)dx(P_i) + P_i) \\ (sy(M_i \to M_k)dy(P_i) + P_i) \end{bmatrix}$$

$$dx^0(P_k^0) = \frac{1}{|N_b(M_k)|} \sum_{i \in N_b(M_k)} dx(P_i)$$

$$dy^0(P_k^0) = \frac{1}{|N_b(M_k)|} \sum_{i \in N_b(M_k)} dy(P_i)$$

c) Selection of Nearest Ellipse $E_k$ (process of the step S327)

The ellipse nearest to the predicted position $P_k^0$ of the marker $M_k$ is obtained. In this case, only an ellipse in which a distance between the predicted position $P_k^0$ and the ellipse satisfies the following is taken into consideration:

$$dist < \beta \sqrt{\{dx^0(P_k^0)\}^2 + \{dy^0(P_k^0)\}^2}$$

Figure 14:
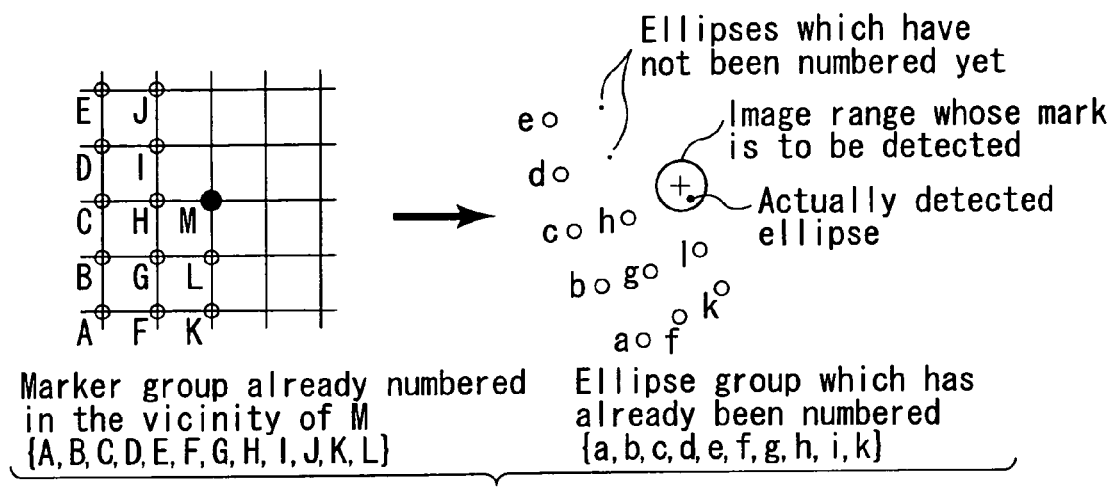
FIG. 14 is an explanatory view of a method of selecting a proximal ellipse.

For example, $\beta = 1/2\sqrt{2}$ (this is shown in FIG. 14).

d) Update of $dx(P_k)$, $dy(P_k)$ (process of the step S328)

Figure 15:
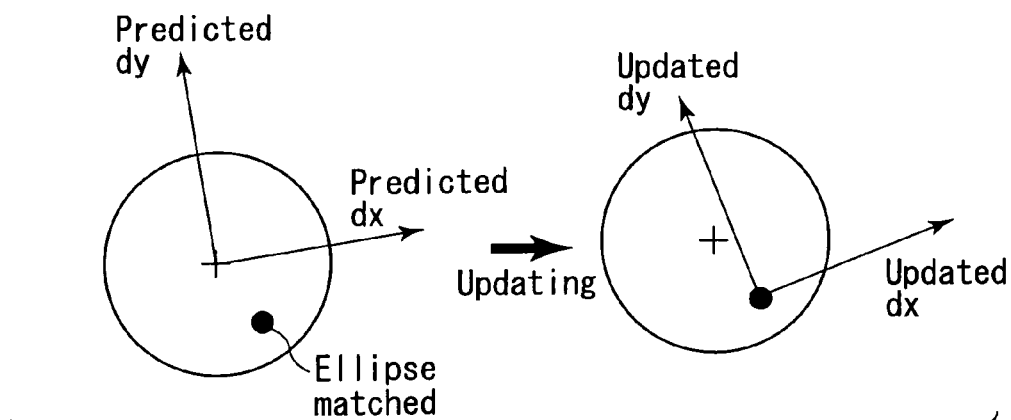
FIG. 15 is an explanatory view showing update of dx, dy.

For a set of the marker and ellipse in which ellipse correspondence is successful in the vicinity of 5×5 of the marker $M_k$ corresponding to $E_k$, the set whose step is only in the x or y direction. That is, only the vicinity marker $M_j$ in which only one of $sx(P_j)$, $sy(P_j)$ is zero and whose corresponding ellipse $E_j$ is established is selected, and dx, dy are updated by the mean value. (This is shown in FIG. 15)

In accordance with the above-described method, the elliptic marker corresponding to the large and small markers $M_0$, $M_1$, . . . in the background region 22 of markers can be extracted from the image. Assuming that the three-dimensional coordinate of the marker $M_i$ is $(x_i, y_i, z_i)$, and the image position corresponding to the marker $M_i$ is $(u_i, v_i)$, information R of the marker obtained from the calibration jig 10 can be obtained as a pair of the three-dimensional coordinate value $(x_i, y_i, z_i)$ in the world coordinate frame and $(u_i, v_i)$ obtained from the two-dimensional image. Here, it is further important that all the markers $M_i$ in the background region 22 of markers are not necessarily detected from the image. That is, as represented by the following, only the detected marker group is represented as the set.

$$R = \{(x_i, y_i, z_i; u_i, v_i) | i = 1, 2, 3, \ldots, n\}$$

Figure 16:
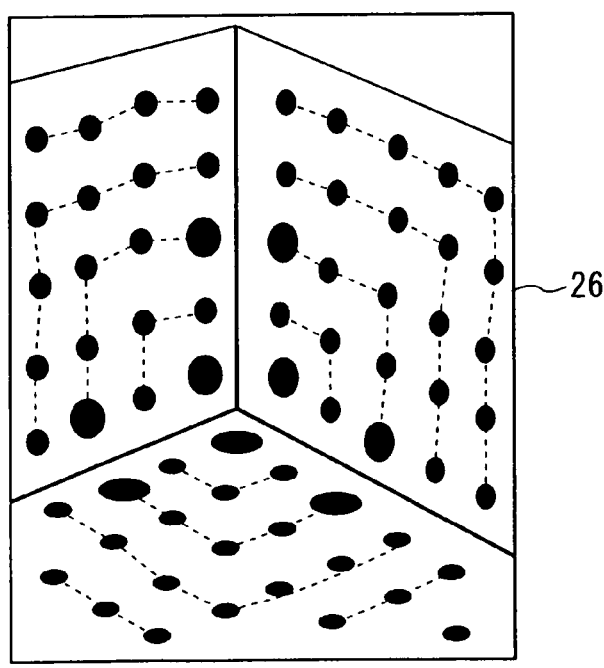
FIG. 16 is a diagram showing a display example of a recognition result.

FIG. 16 is a diagram showing a recognition result displayed in a display screen 26 of a display device disposed in or connected to the arithmetic unit 12. When the results are spirally numbered, as shown in the figure, the number connects the centroids of the markers disposed geometrically adjacent to each other via a dotted line (or a straight line). Then, an operator or a user can visually judge whether the results are correctly numbered. Needless to say, as shown in the figure, the markers disposed geometrically adjacent to each other are not connected to each other via a dotted line or a straight line. Additionally, even when the number of each marker is added, the effect is apparently obtained.

Moreover, in the above description, the vicinity of 5×5 has been used as the vicinity of the marker, but the vicinity of 3×3 or 7×7 may also be used.

Furthermore, a method of using the in-image position $P_j(u_j, v_j)$ of the marker $M_j$ in the vicinity which has heretofore been identified will mainly be described in order to predict the in-image position $P_k(u_k, v_k)$ of the marker $M_k$. However, this prediction is possible, even if the in-image position $P_j(u_j, v_j)$ is not directly used. For example, there is a method of using a radial distance r and angle θ of each marker. That is, the following relational equation may be used to predict the radial distance and angle $(r_k, \theta_k)$ in each marker $M_k$:

$$\begin{cases} r = \sqrt{u^2 + v^2} \\ \theta = \tan^{-1}\frac{v}{u} \end{cases}$$

Since this method is similar to a method of predicting the position $P_k(u_k, v_k)$ in the image, the method is not described here in detail.

(Parameter Calculation Method)

Next, a method of calculating the parameter in the step S33 will be described. As described in the previous paragraph, the marker information R recognized by the marker recognition method can be represented as a set of pairs of a three-dimensional point $(x_i, y_i, z_i)$ and the corresponding two-dimensional point $(u_i, v_i)$. In this paragraph, a method of using these points to calculate the calibration parameter of the image acquisition apparatus 14 will be described.

First, the definition of the camera calibration will be described. With respect to the three-dimensional point (x, y, z) of the world coordinate frame W, coordinate conversion into a camera coordinate frame C is represented using Rotation Matrix $R = (r_{ij})$ and translation vector $T = [t_x, t_y, t_z]^t$. At this time, when the point on the camera image plane is represented by (u', v') including the distortion, the relation can be represented by the following:

$$u_p = \frac{u - u_0}{\alpha_u} = \frac{r_{11}x + r_{12}y + r_{13}z + t_x}{r_{31}x + r_{32}y + r_{33}z + t_z} \quad \text{(above equation (E1))}$$

$$v_p = \frac{v - v_0}{\alpha_v} = \frac{r_{21}x + r_{22}y + r_{23}z + t_y}{r_{31}x + r_{32}y + r_{33}z + t_z}$$

$$u_d = u_p + (g_1 + g_3)u_p^2 + g_4 u_p v_p + g_1 v_p^2 + k_1 u_p(u_p^2 + v_p^2)$$

$$v_d = v_p + g_2 u_p^2 + g_3 u_p v_p + (g_2 + g_4)v_p^2 + k_1 v_p(u_p^2 + v_p^2)$$

$$u' = \alpha_u u_d + u_0$$

$$v' = \alpha_v v_d + v_0$$

At this time, the parameter to be estimated in the camera calibration under this representation can be represented as a 15-dimensional parameter as follows:

$$p = \begin{bmatrix} \alpha_u, \alpha_v, u_0, v_0; \phi_x, \phi_y, \phi_z, t_x, t_y, t_z; \\ k_1, g_1, g_2, g_3, g_4 \end{bmatrix}^t$$

The following is intrinsic parameters of the camera:

$p_{int} = [\alpha_u, \alpha_v, u_0, v_0; k_1, g_1, g_2, g_3, g_4]^t$

This is referred to as extrinsic parameters as a parameter which specifies the position of the camera with respect to the world coordinate frame:

$p_{ext} = [\phi_x, \phi_y, \phi_z, t_x, t_y, t_z]^t$

In the camera calibration, the three-dimensional point group $(x_i, y_i, z_i)$ and the image corresponding point $(u_i', v_i')$ (i=1, 2, ..., n) are used to estimate a calibration parameter p.

Moreover, in these defining equations, $(\alpha_u, \alpha_v, u_0, v_0)$ are parameters associated with the pinhole camera model, and $(k_1, g_1, g_2, g_3, g_4)$ are referred to as parameters associated with the lens distortion. Needless to say, the distortion parameter of the lens may also include parameters $(k_2, k_3, ...)$ dealing with higher-order distortion. However, in the method described below, it is apparent that even a high-order or low-order distortion is not related to the essence of the present invention.

Furthermore, these calibration parameters p are used as terms equivalent to optical parameters of the image acquisition apparatus in the present invention.

In this definition, a concrete method is as follows.

1) First, some or all of the three-dimensional point group $(x_i, y_i, z_i)$ and the image corresponding points $(u_i', v_i')$ (i=1, 2, ..., n) are used to estimate pinhole parameters $P_0$ in the parameters p:

$p_0 = [\alpha_u, \alpha_v, u_0, v_0; \phi_x, \phi_y, \phi_z, t_x, t_y, t_z]^t$

2) Next, the above-described pinhole parameter $P_0$ is combined with an initial estimated value $d_0=[0, 0, 0, 0, 0]^t$ of the parameter concerning the lens distortion $d=[k_1, g_1, g_2, g_3, g_4]t$ to prepare the initial value $P_0$ of p:

$$p_0 = [p_p; d_0]^t$$
$$= [\alpha_u, \alpha_v, u_0, v_0; \phi_x, \phi_y, \phi_z, t_x, t_y, t_z; 0, 0, 0, 0, 0]^t$$

3) The three-dimensional point group $(x_i, y_i, z_i)$, the image corresponding point $(u_i', v_i')$ (i=1, 2, ..., n), and the initial value $p_0$ of p are used to update the estimated value p by an iterative method. In the iterative method, the Kalman Filter may be used. That is, $(u_p, v_p)$ is used as the intermediate parameter, the followings are used as constraint equations, and the estimated value may be updated:

$$u_p = \frac{r_{11}x_i + r_{12}y_i + r_{13}z_i + t_x}{r_{31}x_i + r_{32}y_i + r_{33}z_i + t_z}$$

$$v_p = \frac{r_{21}x_i + r_{22}y_i + r_{23}z_i + t_y}{r_{31}x_i + r_{32}y_i + r_{33}z_i + t_z}$$

$$f \equiv \begin{bmatrix} f_1 \\ f_2 \end{bmatrix}$$

-continued $$= \begin{bmatrix} \alpha_u(u_p + (g_1 + g_3)u_p^2 + g_4 u_p v_p + g_1 v_p^2 + \\ k_1 u_p(u_p^2 + v_p^2)) + u_0 - u' \\ \alpha_v(v_p + g_2 u_p^2 + g_3 u_p v_p + (g_2 + g_4)v_p^2 + \\ k_1 v_p(u_p^2 + v_p^2)) + v_0 - v' \end{bmatrix}$$

$$= 0$$

Concretely, the initial estimated value of p is used as the predicted position to represent mean and covariance matrix ($\bar{p}$, S) as the Kalman Filter constraint equation. Moreover, a measurement value and error covariance matrix with respect to each measurement value $q=(u_i', v_i')$ are represented by ($\bar{q}$, Q). Then, with respect to each three-dimensional point $(x_i, y_i, z_i)$ and the image corresponding point $(u_i', v_i')$, mean and covariance matrix $p:(\bar{p}, S)$, which is the second-order statistics of p, is updated to the following $P_{new}: (\bar{P}_{new}, S_{new})$ by the Kalman Filter. (In this case, f is linearized around the estimated value, and accordingly a so-called Extended Kalman Filter is used.) That is, the following equation group is used:

(1) $M = \dfrac{\partial f}{\partial p}$ (above equation (E2))

(2) $G = \dfrac{\partial f}{\partial q} Q \left[\dfrac{\partial f}{\partial q}\right]^t$ (3) $K = S\, M^t (G + M\, S\, M^t)^{-1}$ (4) $\bar{P}_{new} = \bar{p} - K\, f$ (5) $S_{new} = (I - K\, M)\, S$ (6) Process for the next update $\bar{P} = \bar{P}_{new}$, $S = S_{new}$ While i=1, 2, ..., n is changed with $(x_i, y_i, z_i)$ and the image corresponding point $(u_i', v_i')$, the estimated value p is successively updated, and a mean value $\bar{p}$ of p and estimated error covariance matrix S can be updated.

This method is described, for example, in Y. Motai and A. Kosaka, "Smart View: Hand-Eye Robotic Calibration for Active Viewpoint Generation and Object Grasping," Proceedings of IEEE International Conference on Robotics and Automation, Seoul, Korea, pp. 2183 to 2190, May 2001, or A. Kosaka and A. C. Kak, "Fast Vision-Guided Mobile Robot Navigation Using Model-Based Reasoning and Prediction of Uncertainties," Computer Vision, Graphics, and Image Processing—Image Understanding, Vol. 56, No. 3, pp. 271 to 329, 1992, and is not described in detail here.

Moreover, the equation (E1) has heretofore been described, but there is another method in modeling the camera. For example, in the method disclosed in the document of J. Weng., et al., an intermediate parameter $(u_d, v_d)$ is used between the three-dimensional point $(x_i, y_i, z_i)$ and the corresponding image point $(u_i', v_i')$ to establish the following constraint equation:

$$u_d = \frac{u_i' - u_0}{\alpha_u}$$ (above equation (E3))

-continued $$v_d = \frac{v_i' - v_0}{\alpha_v}$$

$$f_1 = \frac{r_{11}x_i + r_{12}y_i + r_{13}z_i + t_x}{r_{31}x_i + r_{32}y_i + r_{33}z_i + t_z} -$$
$$(u_d + (g_1 + g_3)u_d^2 + g_4 u_d v_d +$$
$$g_1 v_d^2 + k_1 u_d (u_d^2 + v_d^2))$$
$$= 0$$

$$f_2 = \frac{r_{21}x_i + r_{22}y_i + r_{23}z_i + t_y}{r_{31}x_i + r_{32}y_i + r_{33}z_i + t_z} -$$
$$(v_d + g_2 u_d^2 + g_3 u_d v_d +$$
$$(g_2 + g_4)v_d^2 + k_1 v_d (u_d^2 + v_d^2))$$
$$= 0$$

Therefore, the Kalman Filter represented by equation (E2) can be used to similarly estimate p.

In the above method, error component included in the measured two-dimensional point ($u_i'$, $v_i'$) are regarded as relatively small, and estimated. While this Kalman Filter is applied to each measurement point, it is also possible to explude an outlier of measurements with error. This is executed by checking whether or not the distance between the predicted position and the measured position associated with the projections of Marker ($x_i$, $y_i$, $z_i$) onto the image plane exceeds some threshold value, given a current estimate of the parameter p. This method is also disclosed in detail in the document of Kosaka, et al., and is therefore not described here in detail.

As described above, when the boundary (background boundary 24) of the plane 18 constituting the calibration jig 10 is added, the recognition of each plane 18 is facilitated. Since special markers (different sizes or colors) are disposed in some of the calibration markers present in the plane, the numbering (identification) of the markers is facilitated. Therefore, a probability that the outlier by wrong recognition is included in the data necessary for the calibration is very small, and the calibration parameter can be estimated or calculated in a robust manner. While the calibration parameter is estimated, for example, it has also an important effect seen in the present embodiment that the calibration parameter can be estimated with a small numeric calculation amount by the use of the Kalman Filter.

Second Embodiment

In the first embodiment, the calibration jig 10 having a corner cube shape has been photographed only once to estimate the calibration parameter p. In the method described in the present embodiment, to perform more precise estimate, the image acquisition apparatus 14 or the calibration jig 10 is relatively moved and photographed multiple times during the photography of the calibration jig 10, and the calibration parameter is estimated. In this case, as a method of moving the image acquisition apparatus 14, an operator may manually move the image acquisition apparatus 14, or special moving sections (e.g., X stage, rotary stage, or robot) may also be used. That is, in the following method, a detailed movement parameter concerning this movement may not be known. Therefore, the method having further degree of freedom can be proposed, and an apparatus constitution is simplified as compared with the method described in the document of Motai, et al.

Figure 17:
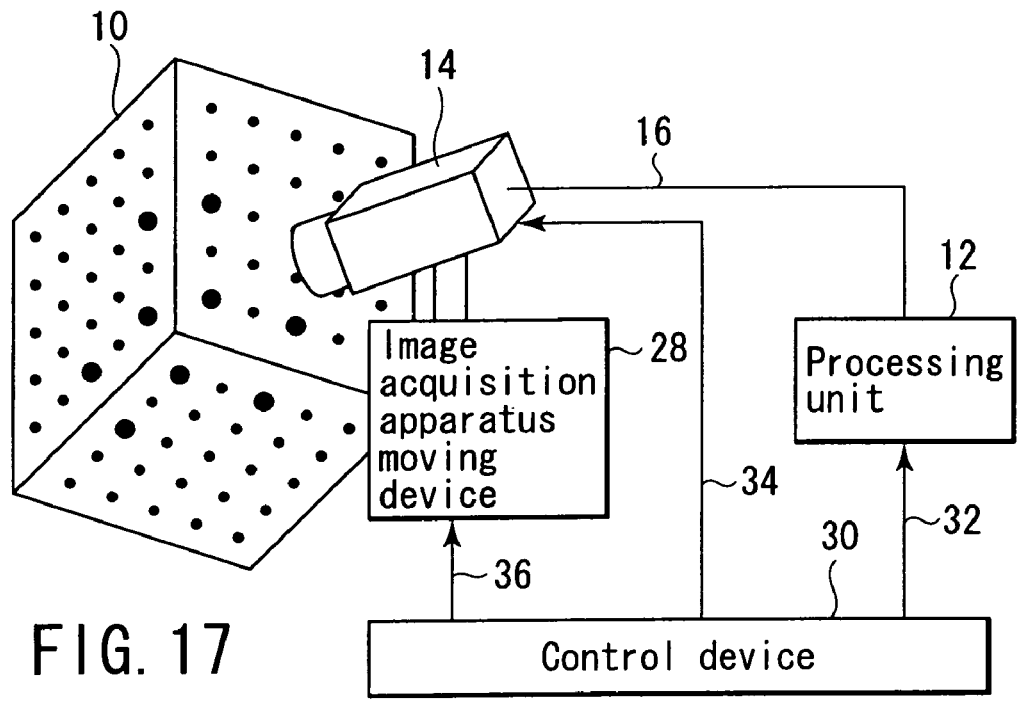
FIG. 17 is a diagram showing a first constitution example of the calibration apparatus according to a second embodiment of the present invention.

FIG. 17 is a diagram showing a first constitution example of the moving section. In this constitution example, an image acquisition apparatus moving device 28 for changing viewpoints of the image acquisition apparatus 14 by the movement of the image acquisition apparatus 14 is added to the constitution of the first embodiment. Moreover, for the image acquisition apparatus 14, processing unit 12, and image acquisition apparatus moving device 28, timings of movement, photography, and calculation are controlled by a control device 30. These timings are determined by control signals 32, 34, 36.

Figure 18:
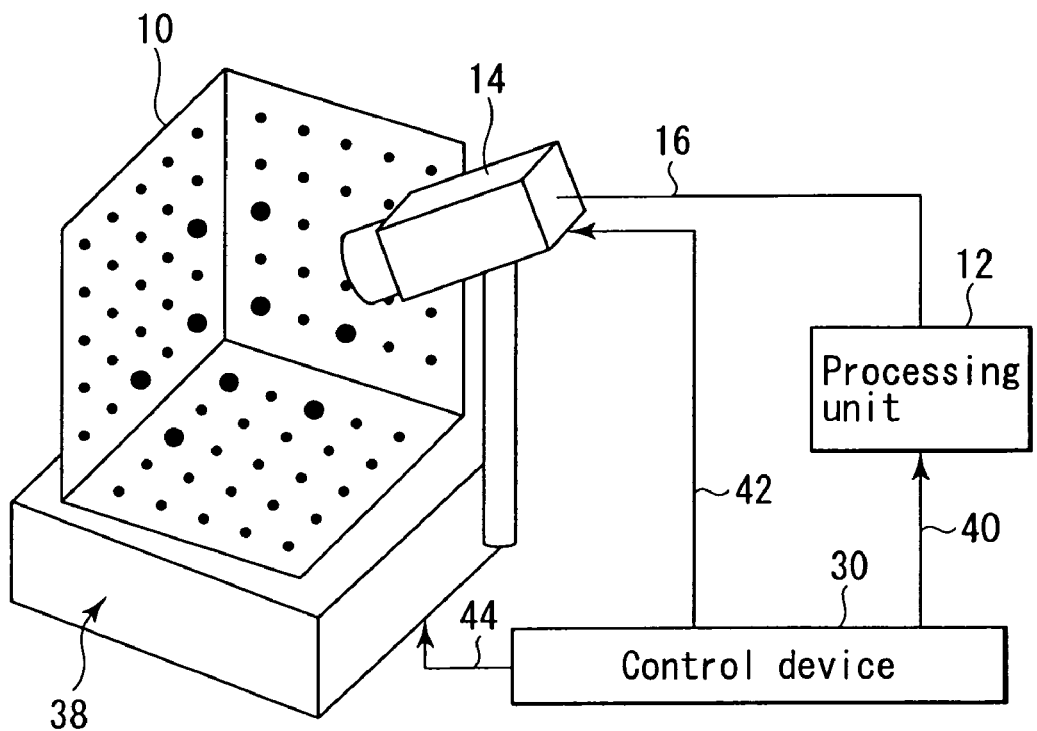
FIG. 18 is a diagram showing a second constitution example of the calibration apparatus according to the second embodiment.

On the other hand, FIG. 18 is a diagram showing a second constitution example in which a calibration jig moving unit 38 for moving the calibration jig 10 is added. In this case, for the image acquisition apparatus 14, processing unit 12, and calibration jig moving unit 38, the timings of the movement, photography, and calculation are controlled by the control device 30. These timings are determined by control signals 40, 42, 44.

As in these first and second constitution examples, to photograph the calibration jig 10 from different viewpoints is especially effective, when the number of markers (or three-dimensional points) for the calibration included in the calibration jig is small. A method of estimating the calibration parameter by a plurality of measurements will hereinafter be described. Here, to photograph the jig a plurality of times, the photography from free viewpoints may be performed, as long as at least a large marker 20b is photographed with respect to a corner cube.

(1) First, the calibration jig 10 is photographed from each viewpoint k, the three-dimensional point ($x_i^k$, $y_i^k$, $z_i^k$) and corresponding image point ($u_i'^k$, $v_i'^k$) are measured, and a calibration parameter $p^k$ concerning the viewpoint is estimated. This method is similar to that of the first embodiment. The parameter to be estimated in this manner is as follows:

$$p^k = \begin{bmatrix} \alpha_u^k, \alpha_v^k, u_0^k, v_0^k; \phi_x^k, \phi_y^k, \phi_z^k, t_x^k, t_y^k, t_z^k; \\ k_1^k, g_1^k, g_2^k, g_3^k, g_4^k \end{bmatrix}^t$$

(2) Next, the calibration parameters from a plurality of viewpoints are put together to produce the parameter p to be estimated:

$$p = \begin{bmatrix} \alpha_u, \alpha_v, u_0, v_0; k_1, g_1, g_2, g_3, g_4; \\ \phi_x^1, \phi_y^1, \phi_z^1, t_x^1, t_y^1, t_z^1; \ldots, \phi_x^m, \phi_y^m, \phi_z^m, t_x^m, t_y^m, t_z^m \end{bmatrix}^t$$

In the above, there are camera intrinsic parameters (intrinsic parameters) $P_{int}$ which are common to $p^k$ and extrinsic parameters $P_{ext}$ which are not common to $p^k$ as follows:

$$p_{int} = [\alpha_u, \alpha_v, u_0, v_0; k_1, g_1, g_2, g_3, g_4]^t$$

$$P_{ext} = \begin{bmatrix} \phi_x^1, \phi_y^1, \phi_z^1, t_x^1, t_y^1, t_z^1; \\ \ldots, \phi_x^m, \phi_y^m, \phi_z^m, t_x^m, t_y^m, t_z^m \end{bmatrix}^t$$

Here, as the initial estimated value of p, the intrinsic parameters for arbitrary viewpoints are used concerning the following, and a value obtained from each viewpoint is used concerning extrinsic parameters.

$$p_{int} = [\alpha_u, \alpha_v, u_0, v_0; k_1, g_1, g_2, g_3, g_4]^t$$

(3) Moreover, the three-dimensional point $(x_i^k, y_i^k, z_i^k)$ photographed in each viewpoint k and the corresponding image point $(u_i^{\prime k}, v_i^{\prime k})$ are used again to update the following:

$$p = \begin{bmatrix} \alpha_u, \alpha_v, u_0, v_0; k_1, g_1, g_2, g_3, g_4; \\ \phi_x^1, \phi_y^1, \phi_z^1, t_x^1, t_y^1, t_z^1; \ldots, \phi_x^m, \phi_y^m, \phi_z^m, t_x^m, t_y^m, t_z^m \end{bmatrix}^t$$

For example, when the number of viewpoints is m, the number of dimensions of p is 9+6m. The constraints with 2 degrees of freedom are established with respect to the image point corresponding to each three-dimensional point in the same manner as in equation (E3). These constraints are used as the constraint equations of the Kalman Filter. Then, the parameter p can be updated in the same manner as in the first embodiment.

When the parameters obtained from multiple viewpoints are used by the use of the above-described steps, the camera calibration parameter can more precisely be estimated.

Third Embodiment

Figure 19:
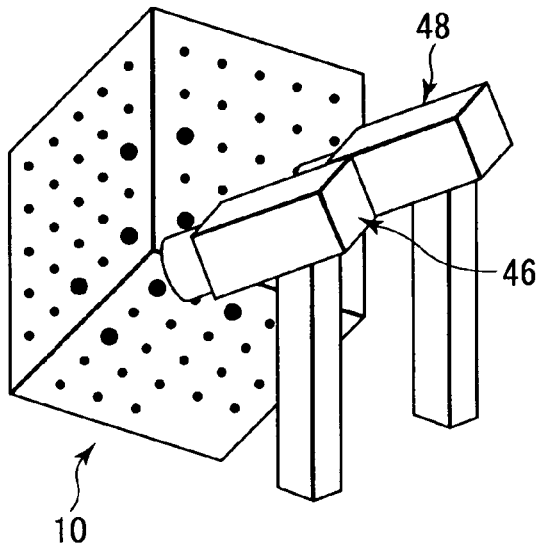
FIG. 19 is a diagram showing that the calibration jig is photographed by the calibration apparatus according to a third embodiment of the present invention.

In a third embodiment, one calibration jig 10 is used to simultaneously calibrate a plurality of cameras. FIG. 19 is a diagram showing that the calibration jig 10 is photographed by the image acquisition apparatus to which the calibration apparatus according to the third embodiment is applied. The image acquisition apparatus 14 is constituted of two cameras 46, 48.

Figure 20:
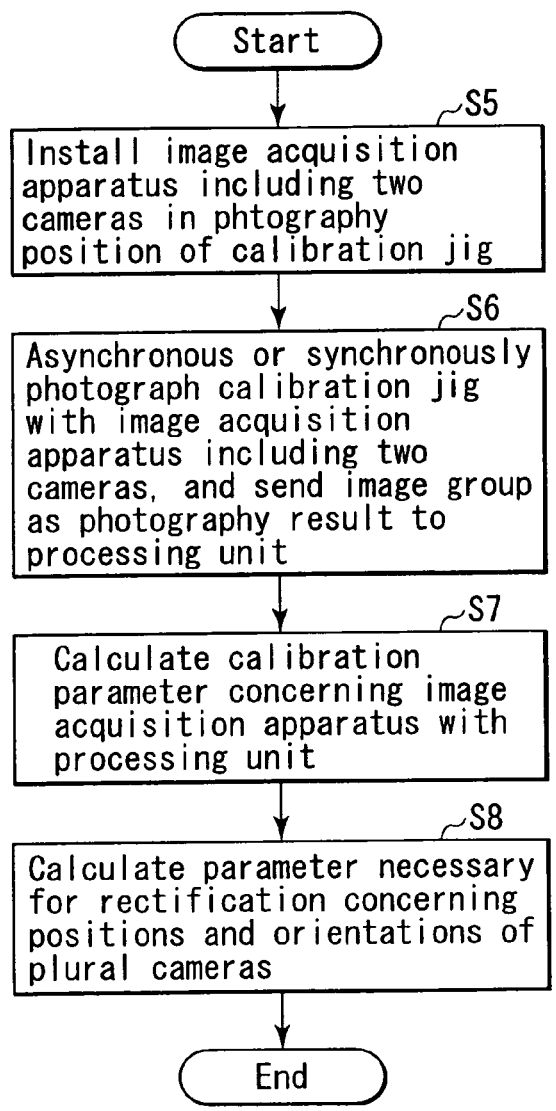
FIG. 20 is an operation flowchart of the whole calibration apparatus according to the third embodiment.

FIG. 20 is a diagram showing an operation flowchart of the whole calibration apparatus according to the present embodiment in which two cameras 46, 48 are simultaneously calibrated. That is, the image acquisition apparatuses (two cameras 46, 48) are set in a place where the calibration jig 10 can be photographed (step S5). Next, the calibration jig 10 is photographed by two cameras 46, 48 (step S6). The photography by two cameras may be performed either synchronously or asynchronously. Two images photographed in this manner are sent to the processing unit 12. Moreover, the camera calibration parameter is first calculated for each camera in the processing unit 12 (step S7). Subsequently, the parameter indicating a relative position and orientation between the cameras is calculated (step S8). This corresponds to the calculation of the camera parameter for rectification well used in so-called binocular stereo.

It is to be noted that a method of calculating the camera parameter necessary for the rectification after the calculation of the camera parameters with respect to the respective cameras 46, 48 is described, for example, in the document of Oliver Faugeras or E. Trucco and A. Verri, Introductory Techniques for 3-D Computer Vision, Prentice Hall, 1988, pp. 157 to 161 in detail, and is not described here. Additionally, as an important point, in the present invention, the distortion parameter of the lens is also estimated. Therefore, the present embodiment is different from the documents of Oliver Faugeras and E. Trucco, et al. in that an operation for removing lens distortion components from the camera images is added before performing the rectification process, and the rectification is performed.

In general, when the same calibration jig is photographed with a plurality of cameras, ranges in which the left and right cameras can perform the photography differ. Therefore, the calibration marker is not necessarily photographed simultaneously both in the camera 46 which is the left camera and the camera 48 which is the right camera. Moreover, there is a problem that a way of photographing the marker or the background image differs, and it is therefore difficult to identify the markers in the left and right images (impart the same number to the same marker). However, the method of the present invention has a new constitution and effect that 1) there are clear boundaries (background boundaries 24) in three planes 18 constituting the calibration jig 10, and that 2) large markers 20b can contribute to an easier identification of the entire set of calibration markers. Therefore, there is a merit that more robust estimate (calculation) is possible in calculating the calibration parameter of the camera.

Figure 21:
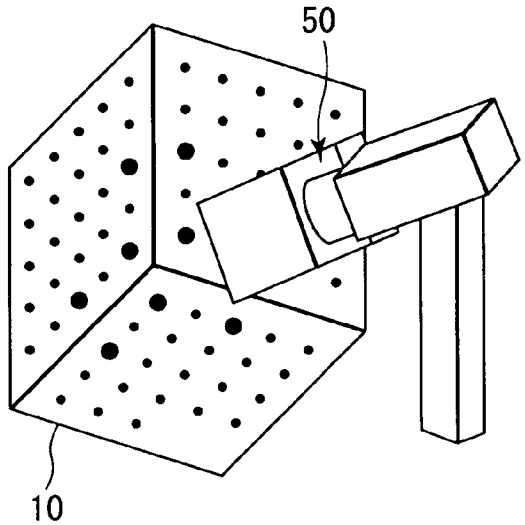
FIG. 21 is a diagram showing that the calibration jig is photographed by the image acquisition apparatus using a camera including a stereo adapter.
Figure 22:
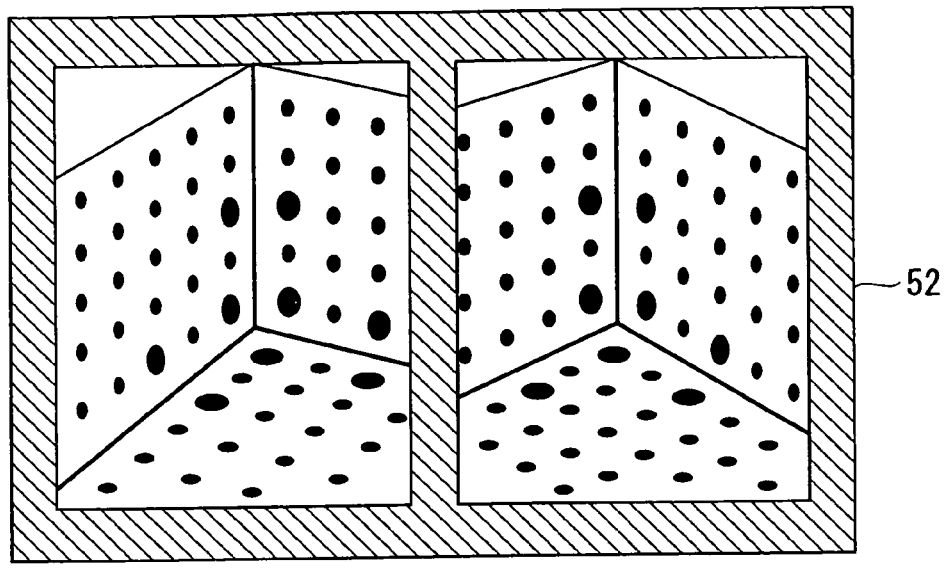
FIG. 22 is a diagram showing a photographed image in this case.

Moreover, the image acquisition apparatus 14 constituted of two cameras 46, 48 has been described with reference to FIG. 19, but the present embodiment is not limited to the use of two cameras. As shown in FIG. 21, the present embodiment is also applicable to a constitution of the image acquisition apparatus 14 by the use of a camera 50 including a stereo adapter. That is, for the camera 50 including the stereo adapter, as shown in FIG. 22, the images of the calibration jig 10 different from one another in parallax are photographed in one frame of image 52. Therefore, when one frame of image 52 is cut into two, the image can be obtained as if the image were photographed with two cameras. Additionally, the function and effect are similar to that by the use of two calibrations, and are not described here in detail. Therefore, even when the image acquisition apparatus 14 is constituted of the camera 50 including the stereo adapter, the calibration apparatus may be constituted to perform an operation in accordance with an operation flowchart similar to that of FIG. 20.

Fourth Embodiment

In the first to third embodiments, the calibration jig 10 including three planes crossing at right angles to one another has mainly been described. However, the present invention is not necessarily limited to the calibration jig 10 of a corner cube type in which the planes cross at right angles to one another. Basically, any calibration jig may be used as long as the jig is constituted of at least two planes or curved surfaces or the three-dimensional positions of the markers in the plane or the curved surface can easily be modeled or registered.

Figure 23:
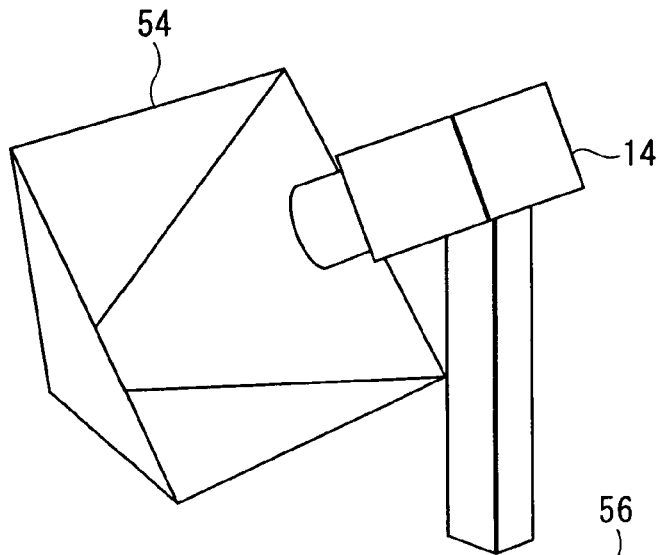
FIG. 23 is a diagram showing an example of the calibration jig according to a fourth embodiment of the present invention.
Figure 24:
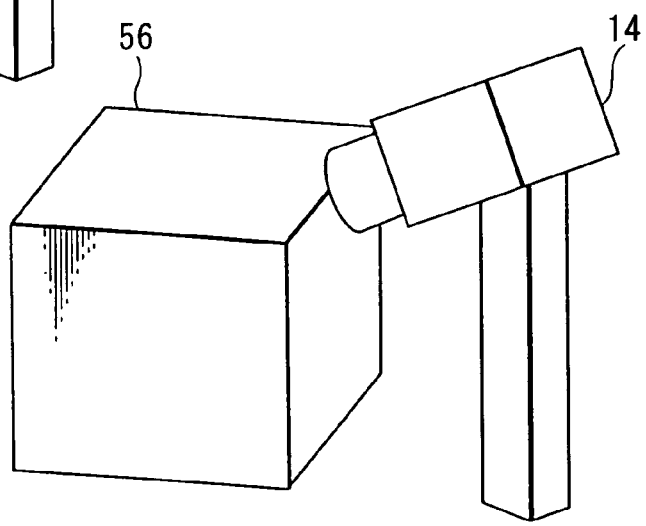
FIG. 24 is a diagram showing another example of the calibration jig according to the fourth embodiment.

From this viewpoint, the calibration jig may be a calibration jig 54 which is a regular tetrahedron as shown in FIG. 23. Alternatively, the jig may also be a calibration jig 56 which has a corner cube shape including three planes having a convex shape, not a concave shape as shown in FIG. 24, and crossing at right angles to one another. Furthermore, as shown in FIGS. 2 to 4, each plane may also have various shapes. Basically, as described in the first embodiment of the present invention, it is important that a marker capable of easily detecting the origin or the direction vector of the plane be disposed in each plane. When the characteristic marker exists in each plane, and the numbering is facilitated, all the methods described in the first to third embodiments are applicable.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A calibration apparatus comprising:
a calibration jig comprising:
at least two planes,
a plurality of calibration markers having known three-dimensional positions, the plurality of calibration markers being arranged in the at least two planes based on a predetermined rule, and
at least one of a plane boundary, a plane boundary group, and a plane boundary curve between the at least two planes in which the calibration markers are arranged, capable of specifying a plane in which a calibration marker is arranged, wherein the at least one of a plane boundary, a plane boundary group, and a plane boundary curve is in a color different from a color of the background of the at least two planes;
a calibration marker recognition section configured to recognize in at least one image of the calibration jig obtained by an image acquisition apparatus the at least one of a plane boundary, a plane boundary group, and a plane boundary curve, to recognize in the at least one image different planes in the at least two planes as different regions using the recognized at least one of a plane boundary, a plane boundary group, and a plane boundary curve, and to measure and number in-image positions of the plurality of calibration markers in the at least one image; and
a parameter estimate section configured to estimate one or more calibration parameters of the image acquisition apparatus based on the known three-dimensional positions of the plurality of calibration markers and the measured in-image positions of the calibration markers numbered by the calibration marker recognition section.

2. The apparatus according to claim 1, wherein the calibration jig includes the calibration markers arranged in such a manner that the calibration markers can be numbered based on the predetermined rule.

3. The apparatus according to claim 1, wherein the calibration jig includes three planes which cross at right angles to one another.

4. The apparatus according to claim 3,
wherein at least two types of calibration markers are arranged in each plane in which the plurality of calibration markers are arranged, and
the calibration marker recognition section is configured to measure and number in-image positions of the plurality of calibration markers in each plane based on the arrangement relation of the at least two types of calibration markers.

5. The apparatus according to claim 4, wherein the calibration jig includes at least two types of calibration markers which have different sizes.

6. The apparatus according to claim 4, wherein the calibration jig includes at least two types of calibration markers which have different colors.

7. The apparatus according to claim 4, wherein the calibration jig includes at least two types of markers which have different shapes.

8. The apparatus according to claim 4, wherein
in the calibration jig, at least one type of the calibration markers is disposed in the vicinity of the origin at which three planes intersect with one another.

9. The apparatus according to claim 1, further comprising a moving section configured to relatively move one of the image acquisition apparatus and the calibration jig in order to photograph a plurality of images in which the calibration jig is reflected from multiple viewpoints.

10. The apparatus according to claim 1, wherein the calibration marker recognition section performs numbering the calibration markers in each plane of the calibration jig based on a predetermined order,
uses information of an image position of a vicinity marker already numbered to predict the position of the marker to be numbered next in the image, and
performs one of selecting an optimal candidate from marker candidates detected in accordance with the prediction and judging that the optimal candidate does not exist.

11. The apparatus according to claim 10, wherein the calibration marker recognition section uses a distance from the prediction position in the selection of the optimum candidate.

12. The apparatus according to claim 10, wherein the calibration marker recognition section uses a distance from the prediction position to judge that the optimal candidate does not exist, and judges that the optimal candidate does not exist, when the distance exceeds a predetermined threshold value.

13. The apparatus according to claim 10, wherein the calibration marker recognition section spirally numbers the calibration markers.

14. The apparatus according to claim 1, further comprising a display section configured to superimpose and display a recognition result of the calibration marker recognized by the calibration marker recognition section upon one of the image photographed by the image acquisition apparatus and another image.

15. The apparatus according to claim 1, wherein all the calibration markers of at least one type of a plurality of types of calibration markers arranged on the calibration jig are reflected in the image of the calibration jig photographed by the image acquisition apparatus.

16. The apparatus according to claim 1, wherein all the calibration markers of at least one type of a plurality of types of calibration markers arranged on the calibration jig are reflected in a middle of the image of the calibration jig photographed by the image acquisition apparatus.

17. The apparatus according to claim 1, wherein
the image acquisition apparatus is image acquisition apparatus including a stereo adapter, and
at least one of the images of the calibration jigs photographed by the image acquisition apparatus including the stereo adapter is photographed in such a manner that all the calibration markers of at least one type of a plurality of types of calibration markers arranged on the calibration jig are arranged in a middle of the image.

18. The apparatus according to claim 1, wherein the image of the calibration jig photographed by the image acquisition apparatus is photographed in such a manner that a part of one of a boundary and a boundary curve of a plurality of planes constituting the calibration jig is positioned in a middle of the image.

19. A calibration apparatus comprising:
a calibration jig comprising:
at least two planes,
a plurality of calibration markers having known three-dimensional positions, the plurality of calibration markers being arranged in the at least two planes based on a predetermined rule, and
at least one of a plane boundary, a plane boundary group, and a plane boundary curve between the at least two planes in which the calibration markers are arranged, capable of specifying a plane in which a calibration marker is arranged, wherein the at least one of a plane boundary, a plane boundary group, and a plane boundary curve is in a color different from a color of the background of the at least two planes;

calibration marker recognition means for recognizing in at least one image of the calibration jig obtained by an image acquisition apparatus the at least one of a plane boundary, a plane boundary group, and a plane boundary curve, for recognizing in the at least one image different planes in the at least two a planes as different regions using the recognized at least one of a plane boundary, a plane boundary group, and a plane boundary curve, and for measuring and numbering in-image positions of the plurality of calibration markers in the at least one image; and parameter estimate means for estimating one or more calibration parameters of the image acquisition means based on the known three-dimensional positions of the plurality of calibration markers and the measured in-image positions of the plurality of calibration markers numbered by the calibration marker recognition means.

20. The calibration apparatus according to claim 1, wherein at least two kinds of calibration markers which are different in at least one of size, shape and color exist in each plane of the calibration jig, and the calibration marker recognition section is configured to label the plurality of calibration markers based on a positional relationship of the calibration markers.

21. The calibration apparatus according to claim 19, wherein at least two kinds of calibration markers which are different in at least one of size, shape and color exist in each plane of the calibration jig, and the calibration marker recognition means labels the plurality of calibration markers based on a positional relationship of the calibration markers.

\* \* \* \* \*